(12) United States Patent
Hill

(10) Patent No.: US 10,907,680 B2
(45) Date of Patent: *Feb. 2, 2021

(54) THROUGH BOLTED CONNECTION HARDWARE

(71) Applicant: Oz-Post International, LLC, Richardson, TX (US)

(72) Inventor: Ian A. Hill, Plano, TX (US)

(73) Assignee: Oz-Post International, LLC, Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/196,069

(22) Filed: Nov. 20, 2018

(65) Prior Publication Data

US 2019/0085888 A1    Mar. 21, 2019

Related U.S. Application Data

(63) Continuation of application No. 15/168,649, filed on May 31, 2016, now Pat. No. 10,151,337, which is a continuation of application No. 14/304,519, filed on Jun. 13, 2014, now Pat. No. 9,377,047.

(60) Provisional application No. 61/835,281, filed on Jun. 14, 2013.

(51) Int. Cl.
*F16B 39/04* (2006.01)
*F16B 21/00* (2006.01)
*F16B 5/06* (2006.01)
*F16B 7/06* (2006.01)

(52) U.S. Cl.
CPC ............ *F16B 39/04* (2013.01); *F16B 5/0642* (2013.01); *F16B 7/06* (2013.01); *F16B 21/00* (2013.01)

(58) Field of Classification Search
CPC .......... F16B 5/0642; F16B 7/06; F16B 21/00; F16B 39/04
USPC ................................................. 411/338, 401
See application file for complete search history.

(56) References Cited

U.S. PATENT DOCUMENTS

| 111,996 A | 2/1871 | Washbourne |
| 153,500 A | 7/1874 | Seymour |
| 236,723 A | 1/1881 | Sellers |
| 529,683 A | 11/1894 | Herman |

(Continued)

FOREIGN PATENT DOCUMENTS

| CN | 200985943 | 12/2007 |
| CN | 201382063 | 1/2010 |

(Continued)

OTHER PUBLICATIONS

Curriculum Vitae of Fred Peterson Smith, presented in Support of Petition for Inter Partes Review of U.S. Pat. No. 9,957,998, *Simpson Strong-Tie Company Inc.* v. *Oz-Post International, LLC*, 4 pages.

(Continued)

*Primary Examiner* — Roberta S Delisle
(74) *Attorney, Agent, or Firm* — Foley & Lardner LLP

(57) ABSTRACT

A through bolted connection hardware includes a bolt having an at least partially threaded shaft and a head. At least one nut connector defines a shaft hole and a head hole that is coaxial with the shaft hole, and the shaft hole is sized to receive the shaft of the bolt and not to allow the head to fit through the shaft hole. An outer surface of the at least one nut connector has a hexagonal shape. A tube defines an axially extending threaded bore that is configured to matingly receive the shaft at a first end of the threaded bore.

17 Claims, 8 Drawing Sheets

(56) References Cited

U.S. PATENT DOCUMENTS

| | | |
|---|---|---|
| D30,898 S | 5/1899 | Paine |
| 721,411 A | 2/1903 | Alexander |
| 933,865 A | 9/1909 | Umholtz |
| 964,827 A | 7/1910 | Whitmore |
| 974,637 A | 11/1910 | Borup |
| 1,086,737 A | 2/1914 | Taylor |
| 1,162,467 A | 11/1915 | Fitz |
| 1,368,222 A | 2/1921 | Foreman |
| 1,374,963 A | 4/1921 | Stevenson |
| 1,400,531 A | 12/1921 | Dodds |
| 1,401,684 A | 12/1921 | Rogers et al. |
| 1,480,253 A | 5/1923 | Fisher |
| 1,506,005 A | 8/1924 | Kraft |
| 1,507,840 A | 9/1924 | Landgraf |
| 1,703,232 A | 2/1929 | Gray et al. |
| 1,908,080 A | 5/1933 | Thompson |
| 1,994,978 A | 3/1935 | Brown |
| 2,278,320 A | 5/1941 | Kath |
| 2,316,695 A | 4/1943 | Jaffa |
| 2,816,473 A | 12/1957 | Labee |
| 3,042,068 A | 7/1962 | Smith |
| 3,174,383 A | 3/1965 | Heil |
| 3,204,586 A | 9/1965 | Marsh, Jr. |
| 3,226,118 A | 12/1965 | Nehl |
| 3,266,828 A | 8/1966 | Baier |
| 3,269,228 A | 8/1966 | Mack |
| 3,449,997 A | 6/1969 | Couch |
| 3,478,639 A | 11/1969 | Gruca |
| 3,492,841 A | 2/1970 | Ipri |
| 3,640,557 A | 2/1972 | Nute, Jr. et al. |
| D233,138 S | 10/1974 | Vogel |
| 3,851,978 A | 12/1974 | Kuipers |
| 3,965,793 A | 6/1976 | Roser |
| 4,033,243 A | 7/1977 | Kirrish et al. |
| 4,080,768 A | 3/1978 | Trixl |
| 4,092,896 A | 6/1978 | Puchy |
| 4,111,568 A | 9/1978 | Wing |
| 4,125,140 A | 11/1978 | Basile |
| 4,134,438 A | 1/1979 | Frieberg et al. |
| 4,207,938 A | 6/1980 | Mortus |
| D256,553 S | 8/1980 | Fayle |
| 4,242,932 A | 1/1981 | Barmore |
| 4,274,754 A | 6/1981 | Cohen |
| 4,281,699 A | 8/1981 | Grube |
| 4,436,005 A | 3/1984 | Hanson |
| D276,879 S | 12/1984 | Bell |
| D278,029 S | 3/1985 | Suponitsky |
| 4,507,009 A | 3/1985 | Tardif |
| 4,540,322 A | 9/1985 | Coffia |
| 4,601,624 A | 7/1986 | Hill |
| 4,621,230 A | 11/1986 | Crouch et al. |
| 4,631,887 A | 12/1986 | Francovitch |
| 4,632,616 A | 12/1986 | Sidoti |
| 4,683,670 A | 8/1987 | Bates |
| 4,708,555 A | 11/1987 | Terry |
| 4,733,986 A | 3/1988 | Kenning et al. |
| 4,822,223 A | 4/1989 | Williams |
| 4,867,624 A | 9/1989 | Walley |
| 4,887,951 A | 12/1989 | Hashimoto |
| D311,131 S | 10/1990 | Saito |
| 4,998,780 A | 3/1991 | Eshler et al. |
| 5,030,052 A | 7/1991 | Anderson et al. |
| 5,175,665 A | 12/1992 | Pegg |
| 5,302,069 A | 4/1994 | Toth et al. |
| 5,433,570 A | 7/1995 | Koppel |
| 5,443,582 A | 8/1995 | Ching |
| 5,577,353 A | 11/1996 | Simpson |
| 5,626,449 A | 5/1997 | McKinlay |
| 5,651,651 A | 7/1997 | Spencer |
| 5,697,746 A | 12/1997 | Brown et al. |
| 5,728,136 A | 3/1998 | Thal |
| 5,769,144 A | 6/1998 | Carter |
| 5,782,078 A | 7/1998 | Brantley |
| 5,904,383 A | 5/1999 | Van Der Wal |
| 5,927,921 A | 7/1999 | Hukari |
| 5,950,506 A | 9/1999 | Busse |
| D416,192 S | 11/1999 | Tu |
| 6,039,140 A | 3/2000 | Painter |
| D422,202 S | 4/2000 | Maki |
| 6,045,312 A | 4/2000 | Hsing |
| 6,047,513 A | 4/2000 | Gibson |
| 6,053,654 A | 4/2000 | Ledingham |
| 6,053,683 A | 4/2000 | Cabiran |
| D432,006 S | 10/2000 | Hussaini |
| 6,220,804 B1 | 4/2001 | Pamer et al. |
| 6,250,841 B1 | 6/2001 | Ledingham |
| 6,287,045 B1 | 9/2001 | Ledingham et al. |
| 6,295,900 B1 | 10/2001 | Julicher et al. |
| 6,309,158 B1 | 10/2001 | Bellinghausen et al. |
| D452,429 S | 12/2001 | Shinjo et al. |
| 6,332,741 B1 | 12/2001 | Janusz |
| 6,361,258 B1 | 3/2002 | Heesch |
| 6,387,129 B2 | 5/2002 | Rieser et al. |
| D459,207 S | 6/2002 | Miyata |
| 6,457,923 B1 | 10/2002 | Grossman |
| 6,478,518 B1 | 11/2002 | Hwang |
| 6,523,309 B1 | 2/2003 | Finlay et al. |
| 6,540,750 B2 | 4/2003 | Burkhart |
| 6,764,114 B1 | 7/2004 | Guillon |
| D512,886 S | 12/2005 | Christensen |
| D520,856 S | 5/2006 | Osiecki et al. |
| D524,149 S | 7/2006 | Kim |
| D551,972 S | 10/2007 | Jacobs |
| D552,977 S | 10/2007 | He et al. |
| D557,132 S | 12/2007 | Shinjo |
| D567,074 S | 4/2008 | Gallien |
| 7,384,225 B2 | 6/2008 | Woolstencroft |
| D581,778 S | 12/2008 | Lesesky |
| D588,893 S | 3/2009 | Radich |
| D600,108 S | 9/2009 | Swan |
| 7,588,386 B2 | 9/2009 | Kielczewski et al. |
| D602,349 S | 10/2009 | Andersson |
| D609,999 S | 2/2010 | Andersson |
| 7,658,580 B1 | 2/2010 | Conway et al. |
| D613,594 S | 4/2010 | Huang |
| D613,595 S | 4/2010 | Huang |
| D614,247 S | 4/2010 | Clausen |
| 7,891,144 B2 | 2/2011 | Gilstrap et al. |
| 7,981,143 B2 | 7/2011 | Doubler et al. |
| D643,279 S | 8/2011 | Crane et al. |
| D646,153 S | 10/2011 | Andersson |
| D646,154 S | 10/2011 | Andersson |
| 8,051,690 B2 | 11/2011 | Camisasca |
| D678,756 S | 3/2013 | Tsai |
| D679,988 S | 4/2013 | Yamazaki |
| 8,459,604 B2 | 6/2013 | Smith et al. |
| 8,506,199 B2 | 8/2013 | Rump et al. |
| 8,540,201 B2 | 9/2013 | Gadd et al. |
| D691,033 S | 10/2013 | Allman |
| D698,234 S | 1/2014 | Bauer |
| 8,622,677 B2 | 1/2014 | Wu et al. |
| D698,637 S | 2/2014 | Su |
| D706,126 S | 6/2014 | Orow |
| D713,243 S | 9/2014 | Hsu |
| D717,207 S | 11/2014 | Fondas et al. |
| D720,785 S | 1/2015 | Sato |
| D721,423 S | 1/2015 | Jacques et al. |
| D725,461 S | 3/2015 | Kopp |
| 9,004,836 B2 | 4/2015 | Wells et al. |
| D733,546 S | 7/2015 | Balzhiser |
| D735,076 S | 7/2015 | Fondas et al. |
| 9,377,047 B2 | 6/2016 | Hill |
| D760,582 S | 7/2016 | Muzic |
| D788,574 S | 6/2017 | Baiz et al. |
| D798,701 S | 10/2017 | Hill |
| D803,040 S | 11/2017 | Schuit et al. |
| D805,882 S | 12/2017 | Berry |
| D813,027 S | 3/2018 | Wright |
| 9,957,998 B2 | 5/2018 | Hill |
| D821,859 S | 7/2018 | Artino |
| D832,184 S | 10/2018 | Woolstencroft |
| D856,126 S | 8/2019 | Liu |
| D864,125 S | 10/2019 | Selig |
| D870,545 S | 12/2019 | Hill |

(56) References Cited

U.S. PATENT DOCUMENTS

| | | |
|---|---|---|
| D871,201 S | 12/2019 | Shinjo |
| D878,194 S | 3/2020 | Lee |
| 10,612,581 B2 | 4/2020 | Rajewski et al. |
| 2002/0197132 A1 | 12/2002 | Cruz et al. |
| 2003/0165371 A1 | 9/2003 | Notaro et al. |
| 2004/0170487 A1 | 9/2004 | Thompson |
| 2005/0053446 A1 | 3/2005 | Huang et al. |
| 2009/0108149 A1 | 4/2009 | Goto |
| 2009/0129887 A1 | 5/2009 | Chang |
| 2010/0086348 A1 | 4/2010 | Funahashi et al. |
| 2010/0172718 A1 | 7/2010 | Gong et al. |
| 2010/0196119 A1 | 8/2010 | Miyagawa et al. |
| 2011/0107710 A1 | 5/2011 | Sias |
| 2011/0121152 A1 | 5/2011 | Ghatikar |
| 2011/0170983 A1 | 7/2011 | Day et al. |
| 2011/0214461 A1 | 9/2011 | Camisasca |
| 2011/0226096 A1 | 9/2011 | Berton et al. |
| 2011/0250035 A1 | 10/2011 | Goldberg et al. |
| 2012/0219380 A1 | 8/2012 | Hutter, III |
| 2013/0089388 A1 | 4/2013 | Liu et al. |
| 2013/0136557 A1 | 5/2013 | Wang |
| 2014/0023457 A1 | 1/2014 | Gaudron et al. |
| 2014/0178150 A1 | 6/2014 | Su et al. |
| 2014/0341649 A1 | 11/2014 | Bryan et al. |
| 2015/0071731 A1 | 3/2015 | Scheerer |
| 2015/0093213 A1 | 4/2015 | Scheerer |
| 2016/0238054 A1 | 8/2016 | Lehtola |
| 2016/0273573 A1 | 9/2016 | Hill |
| 2017/0108026 A1 | 4/2017 | Yang |
| 2017/0138386 A1 | 5/2017 | Hsu |
| 2017/0282236 A1 | 10/2017 | Hutter, III |
| 2017/0284447 A1 | 10/2017 | Falkenstein et al. |

FOREIGN PATENT DOCUMENTS

| | | |
|---|---|---|
| KR | 200169430 | 11/1999 |
| KR | 200183592 | 3/2000 |
| WO | WO-92/07198 | 4/1992 |

OTHER PUBLICATIONS

Declaration of Fred P. Smith, P.E. In Support of Petition for Inter Partes Review of U.S. Pat. No. 9,957,998, *Simpson Strong-Tie Company Inc.* v. *Oz-Post International, LLC*, Jul. 20, 2018, 125 pages.

English machine translation of Chinese Publication No. 21382063; translation provided to Applicant Jun. 19, 2019; 9 pages.

English translation and certificate of translation of Chinese Publication No. 200985943; translation provided to Applicant Jun. 19, 2019; 14 pages.

Expert Report of Fred P. Smith, *Simpson Strong-Tie Company Inc.* v. *Oz-Post International, LLC*, Case No. 3:18-cv-01188-WHO, Jun. 19, 2019, 99 pages.

Fournier, Ron et al., "HPBooks: Metal Fabricator's Handbook", The Berkley Publishing Group, p. 15.

U.S. Appl. No. 15/338,104, filed Oct. 28, 2016, 122 pages.

Petition for Inter Partes Review of U.S. Pat. No. 9,957,998, *Simpson Strong-Tie Company Inc.* v. *Oz-Post International, LLC*, Jul. 23, 2018, 84 pages.

Petitioner Power of Attorney for Inter Partes Review of U.S. Pat. No. 9,957,998, *Simpson Strong-Tie Company Inc.* v. *Oz-Post International, LLC*, 2 pages.

Precision Metalforming Association, Design Guidelines for Precision Metalforming: Metal Stamping, Fabrication, Metal Spinning, Roll Forming, Secondary Operations and Related Subjects, "Spot Welding", Fourth Edition, 2009, pp. 115-122.

Simpson Strong-Tie Company, Inc.'s Invalidity Contentions Pursuant to Patent Local Rule 3-3, *Simpson Strong-Tie Company Inc.* v. *Oz-Post International, LLC*, Docket No. 3:18-cv-01188, Mar. 23, 2018, 458 pages.

Steel 2 Wood Fence Bracket WAP OZ, video post date: Jun. 17, 2014 (online), https://www.homedepot.com/p/Oz-Post-Steel-2-Wood-Fence-Bracket-WAP-OZ-50110/204675163.

Supplemental Expert Report of Fred P. Smith, *Simpson Strong-Tie Company Inc.* v. *Oz-Post International, LLC*, Case No. 3:18-cv-01188-WHO, Jul. 16, 2020, 236 pages.

Webster's Third New International Dictionary, Merriam-Webster Inc., 1993, p. 864.

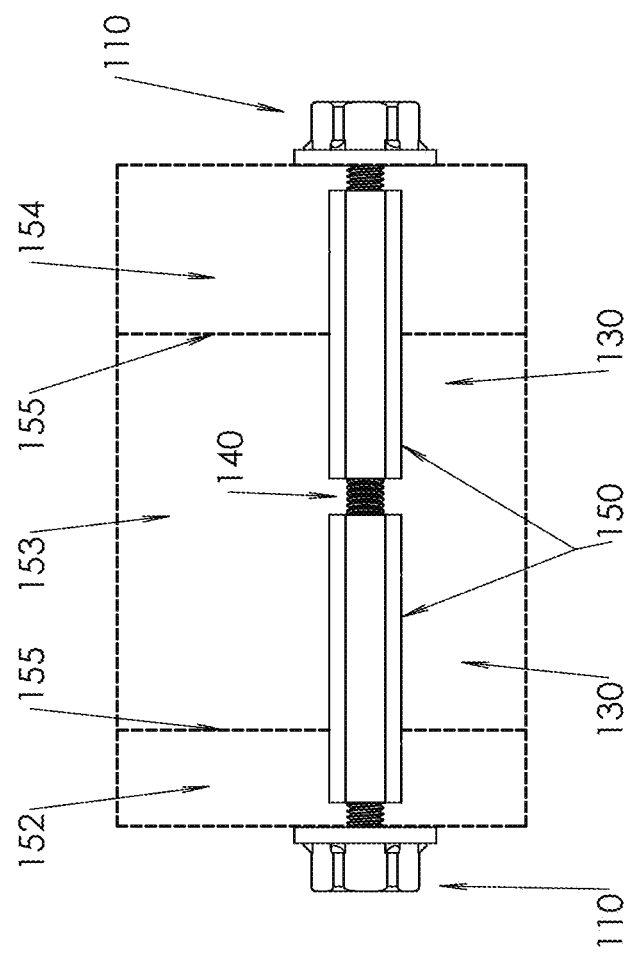

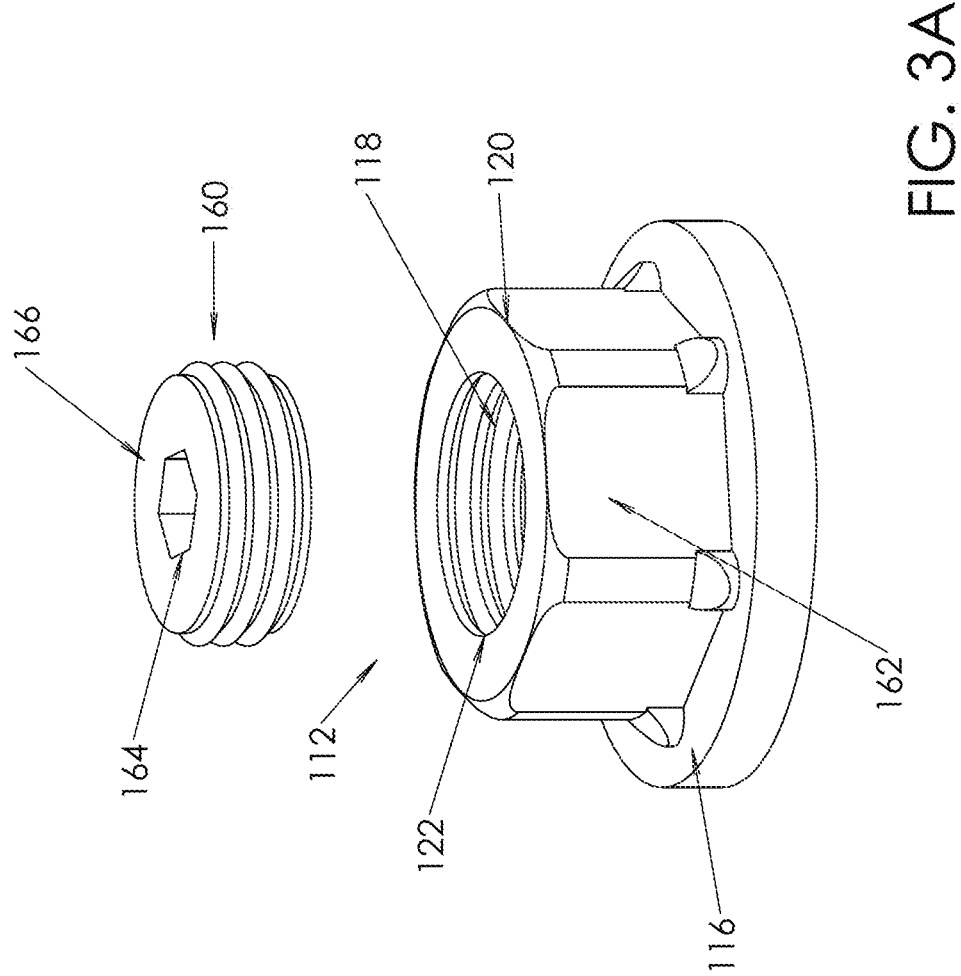

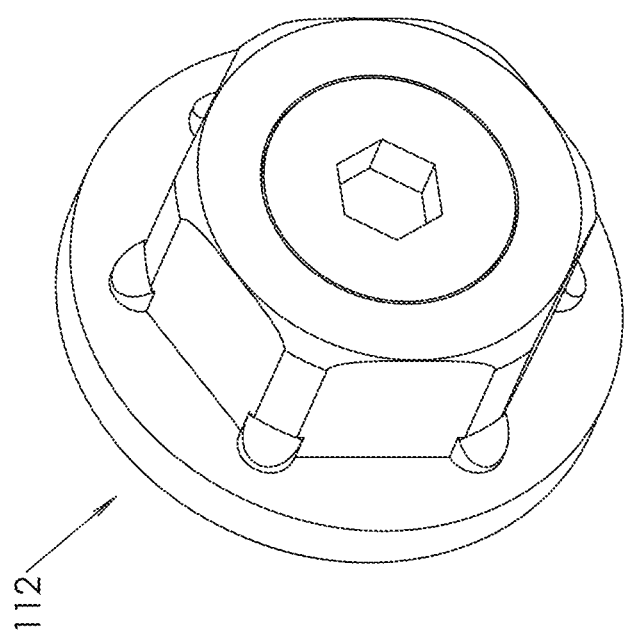

THROUGH BOLTED CONNECTION HARDWARE

PRIORITY CLAIM

This application is a continuation of U.S. patent application Ser. No. 15/168,649, filed on May 31, 2016, which is a continuation of U.S. patent application Ser. No. 14/304,519, filed on Jun. 13, 2014, now U.S. Pat. No. 9,377,047, which claims priority from U.S. Provisional Application for Patent No. 61/835,281 filed on Jun. 14, 2013, the disclosures of which are incorporated by reference.

BACKGROUND

Technical Field of the Invention

The present invention relates generally to mounting hardware and in particular to mounting hardware which imitates architectural hardware and provides structural support.

Description of Related Art

Many construction projects require an assembly referred to in the art as a through bolted connection. A hole is formed to extend through the materials being connected. A bolt (optionally with a washer) is inserted into the hole on one side of the materials, the bolt having a sufficient shaft length such that the threaded end of the bolt passes through the materials and protrudes from the opposite side. A correspondingly threaded nut (optionally with a washer) is then mounted to the threaded end of the bolt. The through bolt assembly is then tightened to connect the materials together.

The making of a through bolted connection can instead use a lag bolt connector which essentially comprises a bolt whose shank is formed in the shape similar to the shank of a wood screw (i.e., a threaded taper). A pilot hole may be formed to extend through and into the materials being connected. The lag bolt (optionally with a washer) is inserted into the hole and driven into the materials until tight to connect the materials together.

A drawback of such conventional hardware connectors is that the shaft lengths of the bolts are fixed. Thus, the consumer must accurately select the proper length of the hardware for the given project. Mistakes can be made (both on the long side and short side).

Such conventional hardware connectors typically exhibit large gaps between sizes (shaft lengths) resulting in the selected fastener for a job often being much longer than required. Excess length can sometimes be cut off, but this requires additional equipment and the cut end must be treated for corrosion or paint. Excess length of hardware which is exposed can also create a safety issue. In summary, conventional hardware is configured to take up slack (i.e., the excess length) on the outside of the connection where it can be seen. It would be an advantage if a through bolted connection could address the slack issue in a way which would preclude the slack from being exposed.

An additional drawback of such conventional hardware connectors concerns appearance. This hardware typically has a utilitarian appearance. In many projects, however, the project aesthetics are incompatible with the utilitarian appearance of the mounting hardware. In such cases, trim carpentry at added expense is sometimes employed to cover the hardware. In other cases, architectural hardware components are selected for use in place of utilitarian hardware components. The term "architectural hardware" refers to hardware having antique designs. If the project budget permits, actual antique hardware components can be used, or alternatively the antique hardware components can be recreated or reproduced from same materials with the same design as the antique original. These options can be quite expensive, and thus are beyond the reach of most projects. Additionally, working with such connectors can require special skills and equipment, thus placing use and installation of architectural hardware components beyond the reach of the conventional consumer (such as a home owner).

Ease of assembly is a critical feature for conventional consumer hardware use. The "Thrulok" ™ brand of screw bolt fastening systems (by FastenMaster) presents an easy to use a through bolted connection. Unfortunately, the "Thrulok" ™ brand suffers from the same concerns described above for other through bolted connection hardware, namely fixed lengths and utilitarian appearance.

A need exists in the art for a structural through bolted connection hardware which supports adjustable length and possesses an aesthetically pleasing architectural appearance at lower cost.

SUMMARY

In an embodiment, a through bolted connection hardware comprises: a first nut-bolt-washer connector including a first base portion and a first bolt portion extending through the first base portion; a second nut-bolt-washer connector including a second base portion and a second bolt portion extending through the second base portion; and a threaded connector having an axially extending central threaded bore configured to matingly receive the first bolt portion at a first end of the central threaded bore and matingly receive the second bolt portion at a second end of the central threaded bore.

In an embodiment, a through bolted connection hardware comprises: a first nut-bolt-washer connector including a first base portion and a first bolt portion extending through the first base portion; a second nut-bolt-washer connector including a second base portion and a second bolt portion extending through the second base portion; a threaded rod; a first threaded connector having an axially extending first central threaded bore configured to matingly receive the first bolt portion at a first end of the first central threaded bore and matingly receive a first end of the threaded rod at a second end of the first central threaded bore; and a second threaded connector having an axially extending second central threaded bore configured to matingly receive the second bolt portion at a first end of the second central threaded bore and matingly receive a second end of the threaded rod at a second end of the second central threaded bore.

In an embodiment, a hardware apparatus comprises: a cylindrical tube having a wall, a first end, a second end and a central axially extending threaded opening passing between the first and second ends; an opening formed to pass through said wall to reach the central axially extending threaded opening; and a friction pin inserted into said opening and extending into said central axially extending opening.

BRIEF DESCRIPTION OF THE DRAWINGS

A more complete understanding of the method and apparatus of the present invention may be acquired by reference to the following Detailed Description when taken in conjunction with the accompanying Drawings wherein:

FIG. 2 is an assembled view of the hardware of FIG. 1 installed to join materials together;

FIG. 3A is a perspective view of the base portion of a nut-bolt-washer connector with a cap portion;

FIG. 3B is an assembled perspective view of FIG. 3A;

DETAILED DESCRIPTION OF THE DRAWINGS

Figure 1:
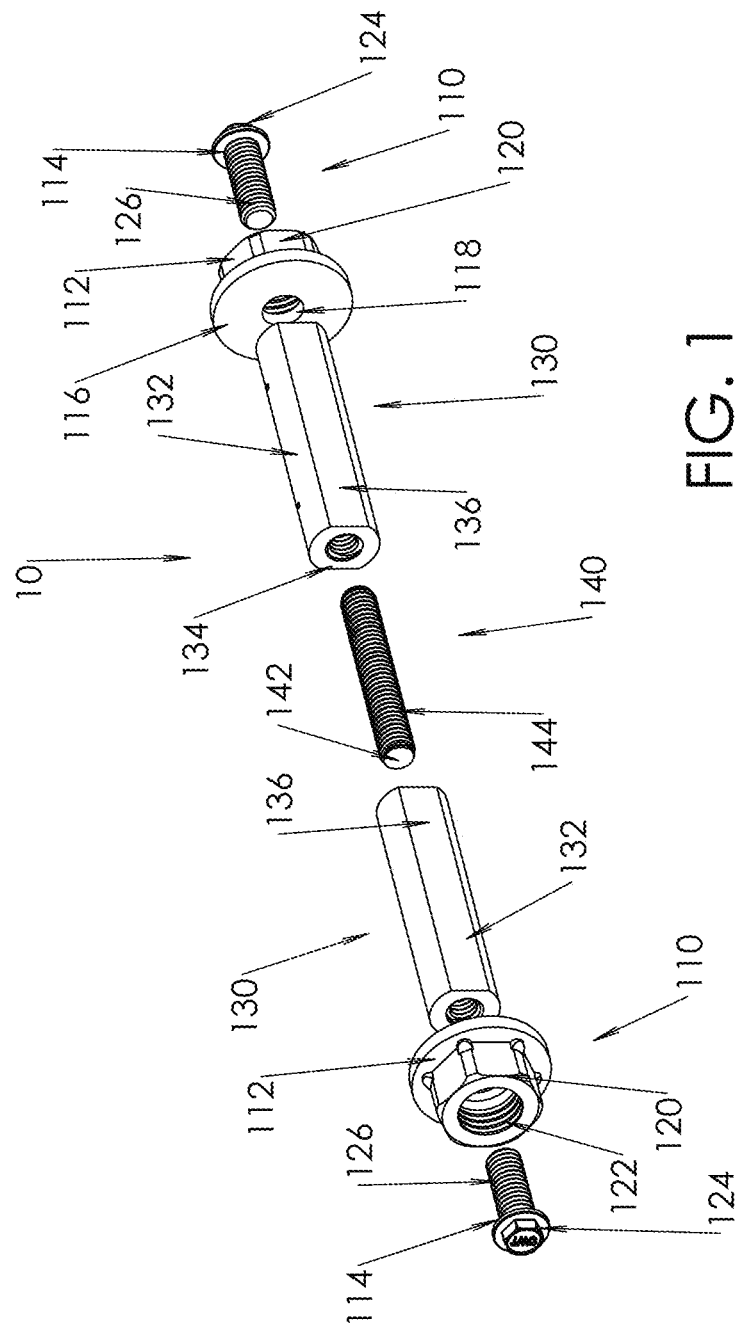
FIG. 1 is an exploded perspective view of the hardware for a through bolted connection.

Reference is now made to FIG. 1 which illustrates an exploded perspective view of the hardware 10 for a through bolted connection.

Figure 8A:
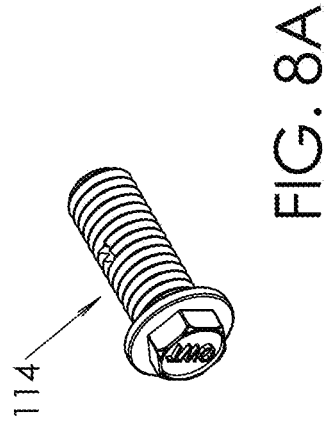
FIGS. 8A and 8B are perspective views of the bolt portion of the nut-bolt-washer connector.
Figure 8B:
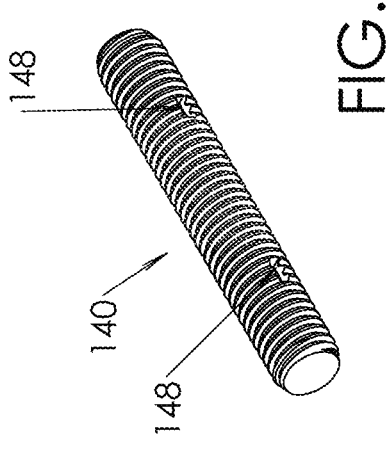

The hardware 10 comprises a nut-bolt-washer connector 110. The nut-bolt-washer connector 110 comprises a base portion 112 and a bolt portion 114. The base portion 112 includes comprises a disc-shaped base plate 116 with an opening 118 formed therein. The base portion 112 further includes a nut portion 120 mounted (for example through welding) to the disc-shaped base plate 116. The nut portion 120 (see, also, FIG. 4) may have a hexagonal shape as expected with a conventional nut, the attached disc-shaped base plate 116 giving the appearance of a washer. The nut portion 120 includes a central threaded opening 122 passing through the nut portion. The central threaded opening 122 and opening 118 are coaxially aligned. The bolt portion 114 includes a head portion 124 and a threaded shaft portion 126 having an external surface thread (see, also, FIG. 8). The head portion 124 has an outer diameter slightly smaller than the diameter of the opening 122 and slightly larger than the diameter of the opening 118. The head portion may comprise a hex shape, as shown, or may take on a rounded or other shape. Drive for the head portion 124 may be provided through the external hex shape, or through the use of other means such as a slot, cross, Allen-type, star-type, etc. The threaded shaft portion has an outer diameter slightly smaller than the diameter of the opening 118.

The bolt portion 114 preferably has mechanical and material properties in accordance with SAE J429 Grade 8 with a proof load of 120,000 psi, a minimum yield strength of 130,000 psi and minimum tensile strength of 150,000 psi, although it will be understood that other mechanical or material properties could be selected based on application.

Figure 10A:
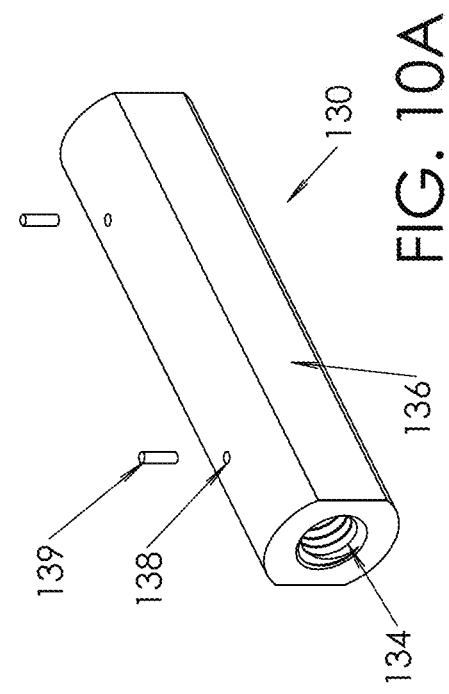
FIG. 10A is a perspective view of the threaded connector.
Figure 10B:
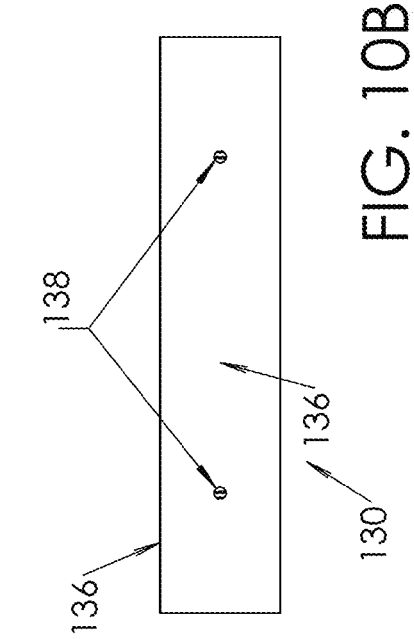
FIG. 10B is a plan view of the threaded connector.
Figure 10C:
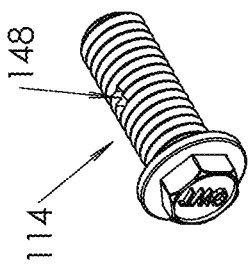
FIG. 10C is a cross-section view of the threaded connector.

The hardware 10 further comprises a threaded connector 130 (see, also, FIGS. 10A, 10B and 10C). The threaded connector 130 is formed in the shape of a cylindrical tube 132 having an outer wall and a central threaded bore 134 having an internal surface thread passing axially therethrough. The outer surface of the tube 132 is configured to include opposed flat surfaces 136 used for tool engagement (for example, to engage with a clamping tool to secure the threaded connector 130 from turning during assembly or to assist with turning the threaded connector 130 during disassembly). An opening 138 is provided to pass through the outer wall of the threaded connector 130 and into the central threaded bore 134. In a preferred embodiment, the opening 138 is oriented parallel to a radius 135 of the cylindrical tube 132 but offset from the axis 137 of the central threaded bore 134 (as shown in FIGS. 10B and 10C). A pin 139 is provided to be set within each opening 138. The pin 139 is preferably made of a deformable material, such as a plastic and more particularly nylon. The pin 139 has a length sufficient to pass through the wall of the threaded connector 130 and extend into the central threaded bore 134.

The threaded connector 130 preferably has mechanical and material properties in accordance with SAE J429 Grade 5 with a proof load of 85,000 psi, a minimum yield strength of 92,000 psi and minimum tensile strength of 120,000 psi, although it will be understood that other mechanical or material properties could be selected based on application.

Figure 9A:
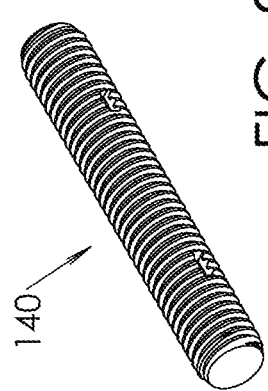
FIGS. 9A and 9B are perspective views of the threaded rod.
Figure 9B:
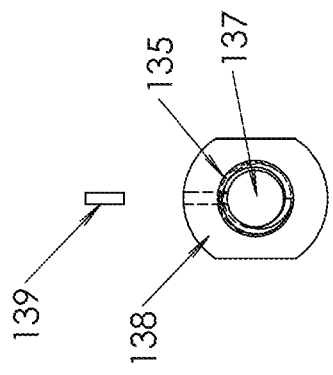

The hardware 10 further comprises a threaded rod 140 (see, also, FIG. 9). The threaded rod 140 is formed in the shape of a solid cylindrical rod 142 having an external surface thread 144.

The threaded rod 140 preferably has mechanical and material properties in accordance with SAE J429 Grade 8 with a proof load of 120,000 psi, a minimum yield strength of 130,000 psi and minimum tensile strength of 150,000 psi, although it will be understood that other mechanical or material properties could be selected based on application.

The external surface thread 144 of the threaded rod 140 matches the external surface thread of the threaded shaft portion 126 for the bolt portion 114. The internal surface thread of the central threaded bore 134 for the threaded connector 130 mates with the external surface thread 144 of the threaded rod 140 matches the external surface thread of the threaded shaft portion 126 for the bolt portion 114.

In assembling the hardware 10, with respect to one nut-bolt-washer connector 110, the shaft portion 126 of the bolt portion 114 is configured to pass through the opening 118, with the head portion resting within the opening 122 against the base plate 116. The threaded shaft portion 126 of the bolt portion 114 mates with the central threaded bore 134 of one threaded connector 130. Tightening of the bolt portion 114 secures the one threaded connector 130 to one nut-bolt-washer connector 110 (it being understood that the bolt portion 114 need not be fully tightened to the point of drawing the threaded connector 130 against the nut-bolt-washer connector 110). The pin 139 extending into the central threaded bore 134 through opening 138 functions as a friction device to resist (but not block) twisting of the threaded shaft portion 126 of the bolt portion 114 within the central threaded bore 134 of the threaded connector 130. This resistance prevents free-spinning of the threaded interconnection between bolt portion 114 and threaded connector 130 during hardware assembly. The threaded rod 140 mates with the one threaded connector 130 at a first end and with another threaded connector 130 at a second end. The pin 139 extending into the central threaded bore 134 through opening 138 functions as a friction device to resist (but not block) twisting of the threaded rod 140 within the central threaded bore 134 of the threaded connector 130. This resistance prevents free-spinning of the threaded interconnection between threaded rod 140 and threaded connector 130. With respect to another nut-bolt-washer connector 110, the shaft portion 126 of the bolt portion 114 is configured to pass through the opening 118, with the head portion resting within the opening 122 against the base plate 116. The threaded shaft portion 126 of the bolt portion 114 mates with the central threaded bore 134 of another threaded connector 130. Tightening of the bolt portion 114 secures the another threaded connector 130 to the another nut-bolt-washer connector 110 (it being understood that the bolt portion 114 need not be fully tightened to the point of drawing the threaded connector 130 against the nut-bolt-washer connector 110). The pin 139 extending into the central threaded bore 134 through opening 138 functions as a friction device to resist (but not block) mating of the threaded shaft portion 126 of the bolt portion 114 with the central threaded bore 134 of the threaded connector 130. This resistance prevents free-spinning of the threaded interconnection between bolt portion 114 and threaded connector 130 during hardware assembly.

In an alternative implementation, the external surface thread 144 of the threaded rod 140 and the outer threaded surface of the threaded shaft portion 126 for the bolt portion 114 are axially scored 148 (the scoring forming a channel-like surface feature). The scoring of the surface functions as a friction device to resist (but not block) twisting of the threaded rod 140 within the central threaded bore 134 of the threaded connector 130. This resistance prevents free-spinning of the threaded interconnection between threaded rod 140 and threaded connector 130. The scoring of the surface further functions as a friction device to resist (but not block) mating of the threaded shaft portion 126 of the bolt portion 114 with the central threaded bore 134 of the threaded connector 130. This resistance prevents free-spinning of the threaded interconnection between bolt portion 114 and threaded connector 130 during hardware assembly.

The assembled hardware 10 is shown in FIG. 2 passing through an opening 150 extending through materials 152, 153 and 154 to be joined together. In this example, material 153 may comprise a vertical post member and the materials 152 and 154 each may comprise a horizontal support member. It is preferred for the threaded connector 130 to be positioned such that it bridges the shear point 155 between adjacent materials in the joint. The opening 150 is larger than the diameter of the threaded rod 140 and the shear point 155 should be positioned away from the location in the opening 150 where the threaded rod lies. Likewise, the any uncovered length of the shaft for the bolt portions should be offset from the shear point 155. With this design, the hardware 10 components are strategically positioned where smaller diameter portions do not result in a compromise of the joint. The tightening of the bolt portion and threaded rod of the hardware 10 creates compression across the joint and the threaded connector, with an outer diameter substantially equal to the diameter of the opening 150, is positioned where shear is most likely to occur.

Reference is now made to FIGS. 3A and 3B which illustrate perspective views of the base portion 112 of the nut-bolt-washer connector 110 and cap portion 160. An outer peripheral surface 162 of the cap portion 160 is threaded to mate with the central threaded opening 122 passing through the nut portion 120. Thus, the cap portion 160 may be attached to the base portion 112 through the threaded interconnection. In this configuration, the base portion 112 comprises a female body member of the assembly and the cap portion 160 comprises a male body member. When then cap portion 160 is assembled to the base portion 112, the cap portion encloses the central threaded opening 122 and covers the bolt portion 114 from view. An opening 164 in a top surface 166 of the cap portion 160 is configured to accept a tool (such as hex driver) to facilitate insertion and extraction of the cap portion 160 within the central threaded opening 122.

Figure 5:
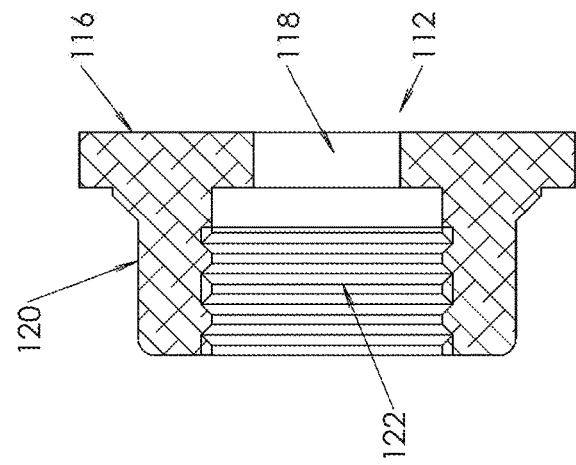
FIG. 5 is a cross-sectional view of the base portion of the nut-bolt-washer connector of FIG. 6.
Figure 4:
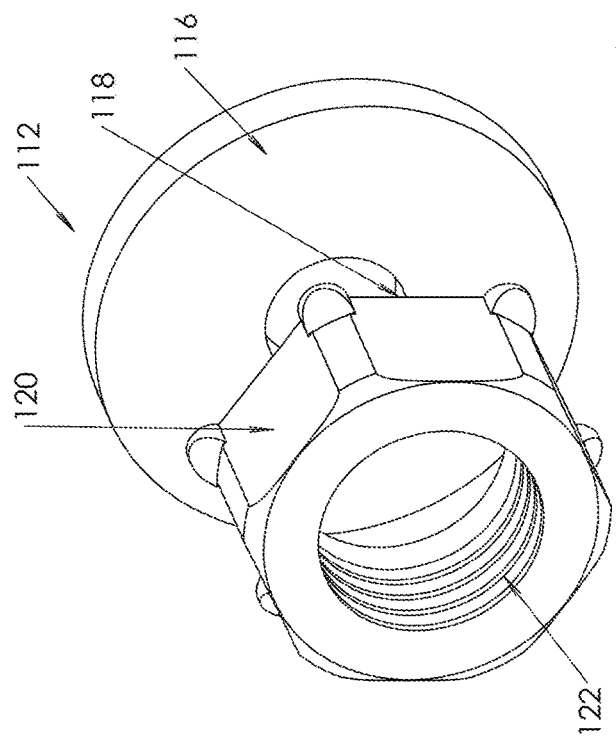
FIG. 4 is an exploded perspective view of a base portion of the nut-bolt-washer connector.

Reference is now additionally made to FIG. 4 which illustrates an exploded perspective view of the base portion 112 and FIG. 5 which illustrates a cross-sectional view of the (assembled) base portion 112. The base portion 112 comprises a disc-shaped base plate 116. The nut portion 120 comprises a cylindrical member is mounted to the base plate 116. The nut portion 120 is preferably centered on the base plate 116. The base plate 116 includes an opening 118 extending there through. The nut portion 120 includes opening 122 coaxially aligned with the opening 118. The nut portion 120 has an inner sidewall and an outer sidewall. The inner sidewall is threaded. The outer sidewall is sized and shaped to imitate a hexagonal nut (or bolt head), with the disc-shaped base plate 116 sized and shaped relative thereto to imitate a washer.

Indeed, the base portion 112 can easily be fabricated from off-the-shelf components. The disc-shaped base plate 116 may be a standard steel hardware washer and the nut portion 120 may be a standard steel hex nut. The hex nut may be welded to the washer with a concentric configuration. The base portion 112 may alternatively comprise a one piece cast steel or aluminum part.

Figure 7:
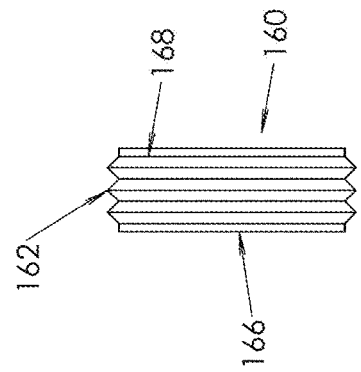
FIG. 7 is a side view of the cap portion.
Figure 6:
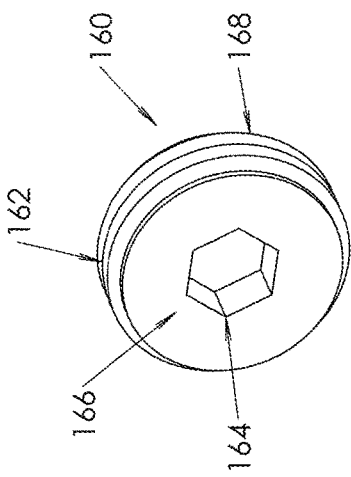
FIG. 6 is a perspective view of a cap portion for the attachment to the base portion of the nut/bolt washer connector.

Reference is now additionally made to FIG. 6 which illustrates a perspective view of the cap portion 160 and FIG. 7 which illustrates a side view of the cap portion 160. The cap portion 160 has a flat top surface 166 and a flat base surface 168. The flat top surface 166 further includes an opening 164 having a hexagonal shape sized to mate with a standard size Allen wrench or other tool. The opening 164 is optional. The cap portion 160 further includes a cylindrical outer surface 162 extending between the flat top surface 166 and the flat base surface 168. The cylindrical outer surface 162 is threaded to matingly correspond with the threaded opening 122 of the base portion 112.

The cap portion 160 may comprise, for example, a steel set screw.

Figure 11:
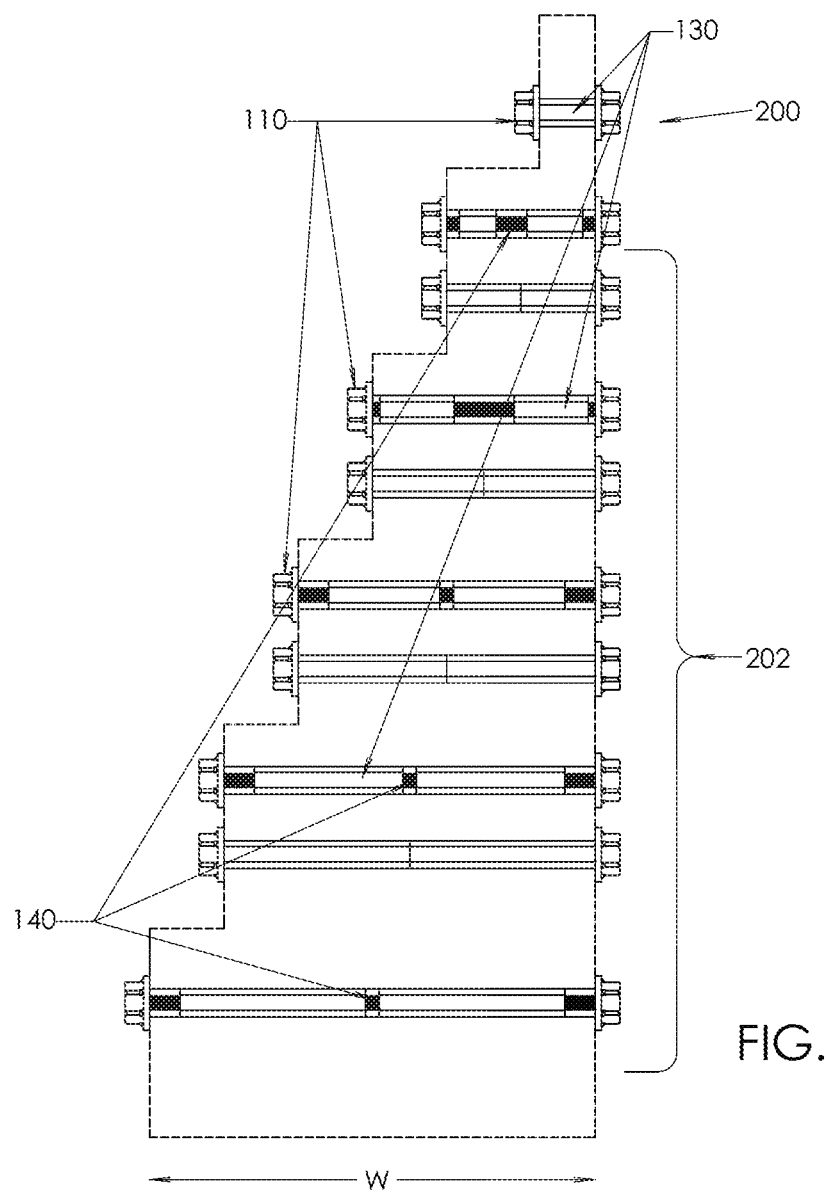
FIG. 11 illustrates various size assemblies for the hardware to accommodate different thicknesses of the materials to be joined.

Reference is now made to FIG. 11 which illustrates various size assemblies for the hardware 10 to accommodate different thicknesses (W) of the materials to be joined.

Reference 200 illustrates the use of a single threaded connector 130 and a pair of nut-bolt-washer connectors 110. Thus, this implementation of the hardware does not require the use of the threaded rod 140. This implementation is well suited when the thickness (W) is about equal to (only slightly larger than) the length of a single threaded connector 130. To that end, in a preferred embodiment, the threaded connectors 130 are manufactured in a number of lengths, wherein those lengths correspond to or are slightly less than standard or common thicknesses of materials to be assembled. As an example, the threaded connector 130 may be made with a length approximately equal to, generally slightly shorter than, two standard board thicknesses (such as twice the 2-inch dimension of a standard 2×4, 2×6, 2×8, 2×10, 2×12, board, i.e., slightly less than twice 1.5").

The examples illustrated in FIG. 12 show a number of different lengths for the threaded connectors 130. In this illustration, threaded connectors 130 having lengths of 2", 3", 4" and 5" are shown.

Reference 202 illustrates the use of a pair of threaded connectors 130, a single threaded rod 140 and a pair of nut-bolt-washer connectors 110. Although the pair of threaded connectors 130 used are each shown to have the same length, it will be understood that in some implementations the lengths of the threaded connectors 130 may be different. The amount of exposed threaded rod 140 (i.e., that portion of the rod not within the threaded connector 130) may be adjusted during assembly of the hardware 10 as describe herein so as to accommodate different thicknesses (W). Additionally, the lengths of the threaded connectors 130 chosen for the hardware 10 may be selected so as to accommodate different thicknesses (W). It will be noted that for a same thickness (W) different combinations of a pair of threaded connectors 130 and a single threaded rod 140 may be used.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A through bolted connection hardware, comprising:
   a bolt having a shaft and a head, the shaft being at least partially threaded;
   at least one nut connector having a hexagonal portion extending from a disc-shaped base plate having a flange portion disposed radially external to the hexagonal portion, the at least one nut connector defining a shaft hole and a head hole being coaxial with the shaft hole, the shaft hole being sized to receive the shaft of the bolt and not to allow the head to fit through the shaft hole, the head hole being sized to receive the head.

2. The hardware of claim 1 further comprising a cap received within the head hole.

3. The hardware of claim 2 wherein the at least one nut connector further includes an inner threaded surface and the cap includes an outer threaded surface, said cap being attachable to the at least one nut connector through engagement of the inner and outer threaded surfaces.

4. The hardware of claim 1 wherein the head of the bolt comprises a drive feature selected from the group consisting of: slot, cross, Allen-type, star-type, and external hex shape.

5. The hardware of claim 1 further comprising:
   a tube defining an axially extending threaded bore configured to matingly receive the shaft at a first end of the threaded bore;
   a second bolt having a second shaft and a second head, the second shaft being at least partially threaded;
   a second nut connector defining a second shaft hole and a second head hole being coaxial with the second shaft hole, the second shaft hole being sized to receive the second shaft of the second bolt and not to allow the second head to fit through the second shaft hole, the second head hole being sized to receive the second head, and the tube configured to matingly receive the second shaft at a second end of the threaded bore opposite the first end, a second outer surface of the second nut connector having a hexagonal shape; and
   a second cap received within the second head hole.

6. The hardware of claim 5 wherein the second nut connector further includes a second inner threaded surface and the second cap includes a second outer threaded surface, said second cap being attachable to the second nut connector through engagement of the second inner and outer threaded surfaces.

7. The hardware of claim 1 further comprising:
   a tube defining an axially extending threaded bore configured to matingly receive the shaft at a first end of the threaded bore;
   a first end of a threaded rod received at a second end of the threaded bore opposite the first end; and
   a second tube having a second axially extending threaded bore configured to matingly receive a second end of the threaded rod at a first end of the second threaded bore.

8. The hardware of claim 7 further comprising:
   a second bolt having a second shaft and a second head, the second shaft being at least partially threaded;
   a second nut connector defining a second shaft hole and a second head hole being coaxial with the second shaft hole, the second shaft hole being sized to receive the second shaft of the second bolt and not to allow the second head to fit through the second shaft hole, the second head hole being sized to receive the second head, and the second tube configured to matingly receive the second shaft at a second end opposite the first end of the second axially extending threaded bore; and
   wherein a second outer surface of the second nut connector has a hexagonal shape.

9. The hardware of claim 8 wherein the second nut connector further includes a second inner threaded surface, and further comprising a second cap including a second outer threaded surface, said second cap being attachable to the second nut connector through engagement of the second inner and outer threaded surfaces.

10. A hardware apparatus for joining structural members, comprising:
    a first bolt having a first at least partially threaded shaft;
    a first nut-washer connector having a first hexagonal portion extending from a first disc-shaped base plate, a first flange portion of the first disc-shaped base plate disposed radially external to the first hexagonal portion, the first nut-washer connector defining a first cap opening and a first shaft opening;
    a first cap configured to be received within the first cap opening and the first at least partially threaded shaft configured to be received through the first shaft opening;
    a second bolt having a second at least partially threaded shaft;
    a second nut-washer connector having a second hexagonal portion extending from a second disc-shaped base plate, a second flange portion of the second disc-shaped base plate disposed radially external to the second hexagonal portion, the second nut-washer connector defining a second cap opening and a second shaft opening; and
    a second cap configured to be received within the second cap opening and the second at least partially threaded shaft received through the second shaft opening; and
    a tube defining an axially extending threaded bore configured to matingly receive the first at least partially threaded shaft at a first end of the threaded bore and the second at least partially threaded shaft at a second end of the threaded bore opposite the first end.

11. The hardware apparatus of claim 10 wherein each of the first and second hexagonal portions define an inner threaded surface and the first and second caps each having outer threaded surfaces configured to engage the respective inner threaded surfaces of the first and second hexagonal portions.

12. The hardware apparatus of claim 10 wherein each of the first and second caps include a driving opening configured to receive a driving tool.

13. The hardware apparatus of claim 12 wherein the driving opening is hexagonally-shaped.

14. A hardware connector assembly, comprising:

a first bolt having a first shaft and a first head, the first shaft being at least partially threaded;

a first nut-washer connector having a first hexagonal portion extending from a first disc-shaped base plate, a first flange portion of the first disc-shaped base plate disposed radially external to the first hexagonal portion, the first nut-washer connector defining a first head opening and a first shaft opening disposed coaxial with the first head opening;

a second bolt having a second shaft and a second head, the second shaft being at least partially threaded;

a second nut-washer connector having a second hexagonal portion extending from a second disc-shaped base plate, a second flange portion of the second disc-shaped base plate disposed radially external to the second hexagonal portion, the second nut-washer connector defining a second head opening and a second shaft opening disposed coaxial with the second head opening;

a first tube defining a first axially extending threaded bore configured to matingly receive the first shaft at a first end of the first axially extending threaded bore;

a first end of a threaded rod received at a second end of the first axially extending threaded bore opposite the first end; and a second tube having a second axially extending threaded bore configured to matingly receive a second end of the threaded rod at a first end of the second axially extending threaded bore and to receive the second shaft at a second end of the second axially extending threaded bore opposite the first end;

wherein the first shaft opening is sized to receive the first shaft of the first bolt and not to allow the first head to fit through the first shaft opening, the first head opening being sized to receive the first head, and the second shaft opening is sized to receive the second shaft of the second bolt and not to allow the second head to fit through the second shaft opening, the second head opening being sized to receive the second head.

15. The hardware connector assembly of claim 14 further comprising a first cap configured to be received by the first hexagonal portion and a second cap configured to be received by the second hexagonal portion.

16. The hardware connector assembly of claim 15 wherein each of the first and second hexagonal portions define an inner threaded surface and the first and second caps each have outer threaded surfaces configured to engage the respective inner threaded surfaces of the first and second hexagonal portions.

17. The hardware connector assembly of claim 14 wherein each of the first and second heads include a driving feature selected from the group consisting of: a slot, a cross, an Allen-type, a star-type, and an external hex shape.

* * * * *